United States Patent [19]

Belew

[11] 3,737,117
[45] June 5, 1973

[54] DOCKING STRUCTURE FOR SPACECRAFT
[75] Inventor: Robert R. Belew, Huntsville, Ala.
[73] Assignee: The United States of America as represented by the Administrator of the National Aeronautics and Space Administration, Washington, D.C.
[22] Filed: July 6, 1971
[21] Appl. No.: 159,966

[52] U.S. Cl..............................244/1 SD, 244/137 P
[51] Int. Cl...............................................B64g 1/00
[58] Field of Search ...................244/1 R, 1 SS, 1 SD, 244/135 A, 137 P; 114/16.6

[56] References Cited
UNITED STATES PATENTS
2,942,816  6/1960  Dostie..............................244/137 P
3,526,372  9/1970  Paine..................................244/1 SD Primary Examiner—Duane A. Reger
Assistant Examiner—Barry L. Kelmachter
Attorney—L. D. Wofford, Jr., W. H. Riggins and John R. Manning

[57] ABSTRACT

A docking structure for a pair of spacecraft comprising a conical receptacle on the docking end of a first spacecraft that receives a mating conical projection on the docking end of the second spacecraft. The conical receptacle of the first spacecraft constitutes an exterior portion of a sealed gas-tight compartment. Pressurization of the sealed compartment causes the conical receptacle to extend toward the incoming conical projection of the second spacecraft and when the mating conical portions are latched together, the docking energy is absorbed by the compressed gas in the sealed compartment. Rebound forces are countered by a plurality of actuator cylinders supporting the conical receptacle.

10 Claims, 8 Drawing Figures

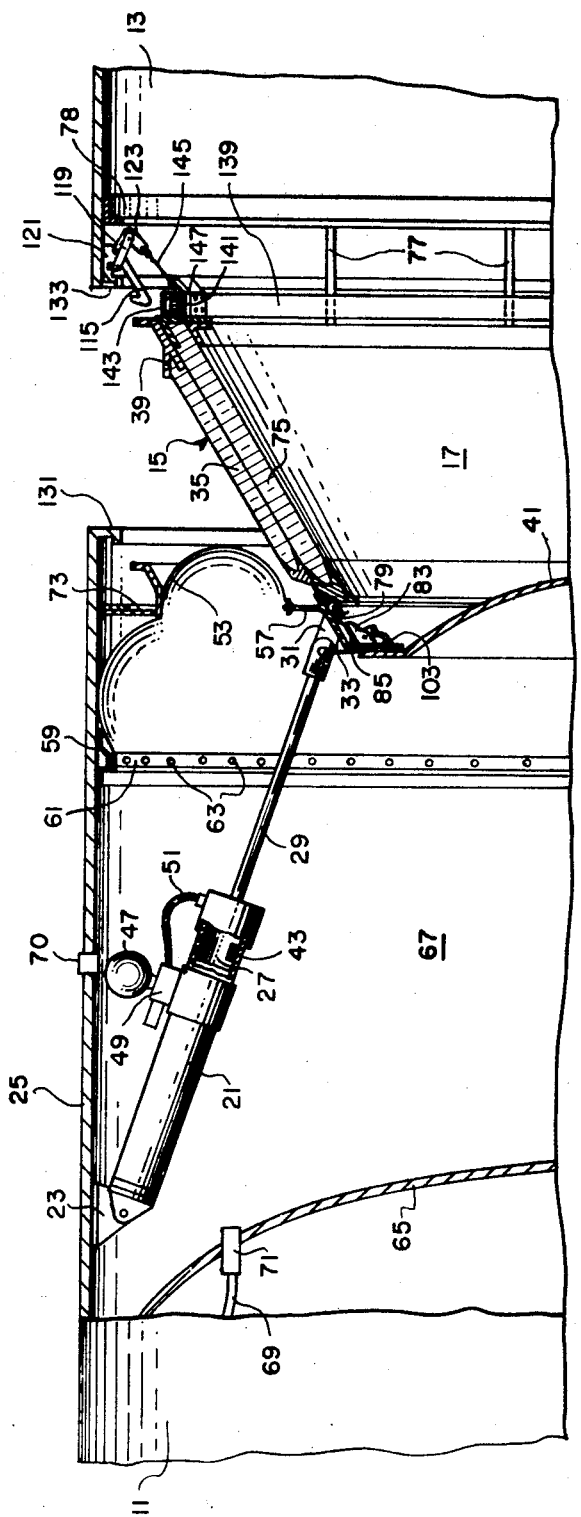

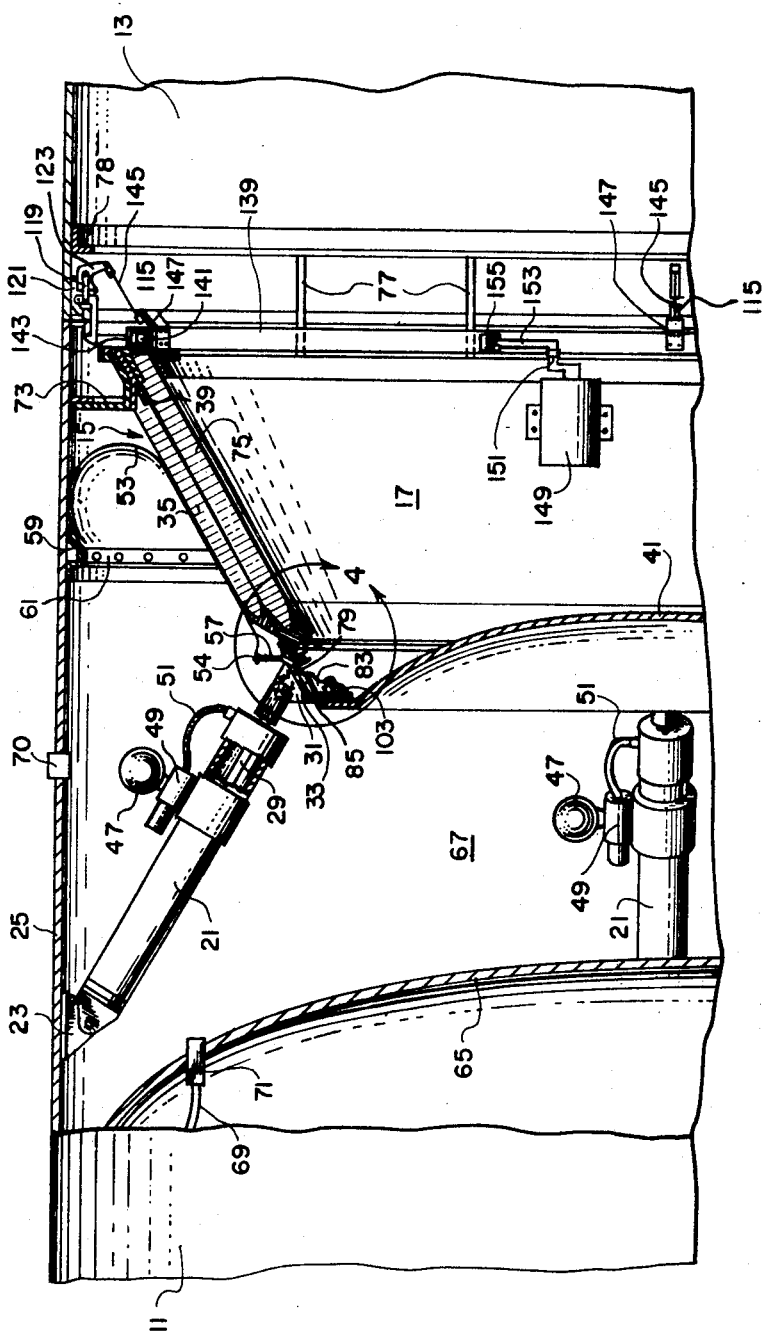

ROBERT R. BELEW
INVENTOR

BY Wayland H. Riggins
ATTORNEY 3,737,117

DOCKING STRUCTURE FOR SPACECRAFT

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

This invention relates generally to docking structures and more particularly to high energy absorption means for docking a pair of relatively large spacecraft in flight.

Manned space facilities now being planned for the future will require the rendezvousing and docking of spacecraft that are relatively large and massive compared to the spacecraft modules that have been involved in docking maneuvers thus far in the manned moon missions. Very large modules will be assembled in space to establish long duration earth-orbiting manned space bases that will be periodically serviced by reuseable shuttle vehicles. In assembling and servicing these space modules it is anticipated that docking structures having a high energy absorbing capability will be required since the docking velocities involved may be several feet per second.

Previously proposed docking structures utilize a variety of means for effecting mating and latching of the docking spacecraft. However, these prior docking devices have not provided for the energy absorption that would be required for the docking of very large spacecraft at velocities of several feet per second.

SUMMARY OF THE INVENTION

The invention comprises an extendable and retractable receptacle on the docking end of a first spacecraft that receives a corresponding projection on the docking end of a second spacecraft. The receptacle forms part of the enclosure of a sealed gas-tight compartment in the docking end of the first spacecraft. An annular flexible membrane supports the receptacle and maintains a seal between the receptacle and the outer wall of the sealed compartment. The receptacle is extended prior to docking by pressurizing the sealed compartment. When the projection of the second spacecraft enters the receptacle and is latched thereto the docking energy is absorbed by compression of the gas in the sealed compartment and by friction producing means that are incorporated in actuator cylinders utilized for retracting the receptacle and drawing the docked spacecraft together.

Accordingly, it is a general object of the present invention to provide an improved high energy absorption docking structure.

Another object of the invention is to provide a docking structure that automatically guides the docking vehicles into proper alignment and couples the vehicles together to provide a sealed interconnection between the docked vehicles.

Another object of the invention is to provide a docking structure capable of docking relatively large and massive spacecraft at relative docking velocities of several feet per second.

These and other objects and advantages of the invention will become apparent upon reference to the following specification, attendant claims and drawing.

BRIEF DESCRIPTION OF THE DRAWING

FIG. 1 is an elevational view showing the docking ends of two space vehicles equipped with the present invention and approaching each other for docking.

FIG. 2 is a partial sectional view showing the docking ends of the space vehicles of FIG. 1 subsequent to mating and latching of the mating conical sections of the docking structure.

FIG. 3 is a partial sectional view showing the docking ends of the vehicles of FIGS. 1 and 2 fully docked.

FIG. 5 is a sectional view taken along line 5—5 of FIG. 4.

DESCRIPTION OF THE PREFERRED EMBODIMENT

Figure 4:
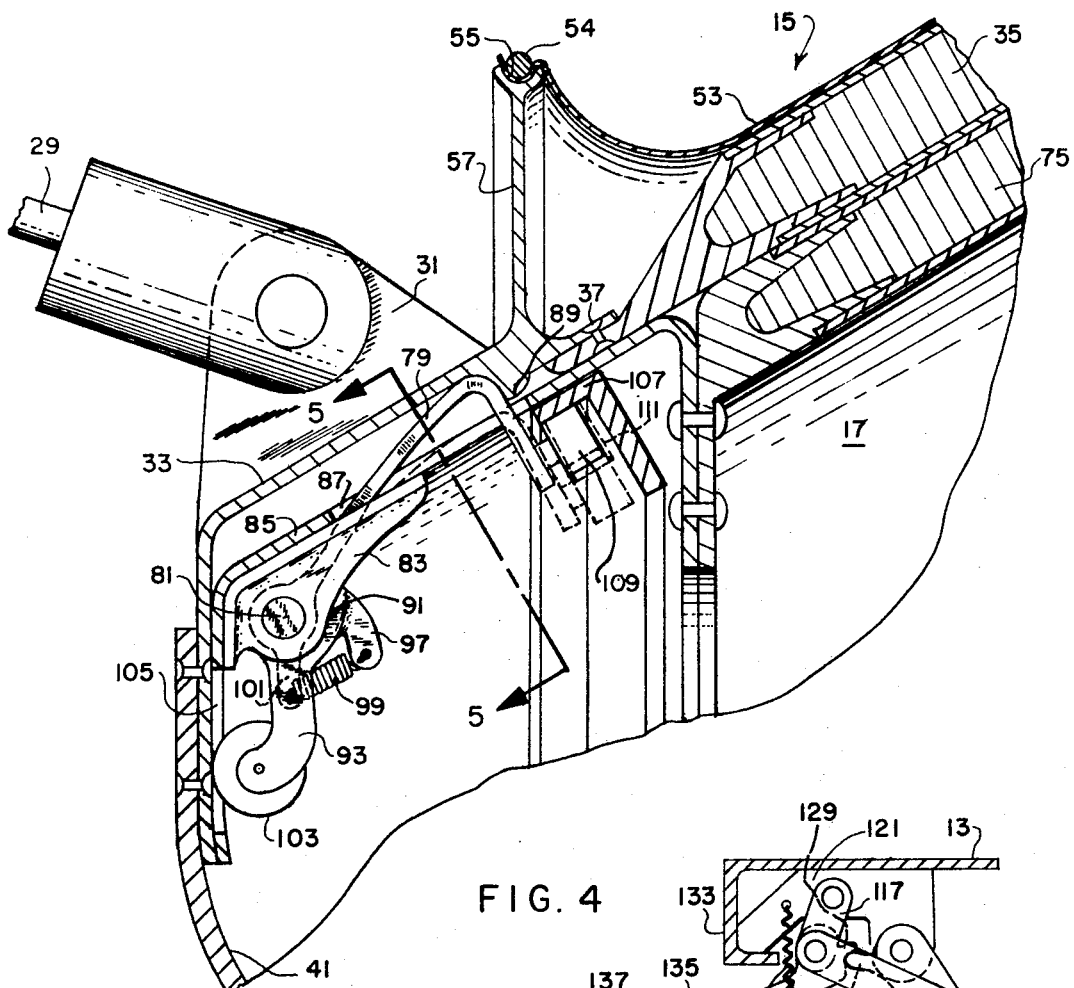
FIG. 4 is an enlarged sectional view of a portion of the mating conical sections of the docking structure encircled in FIG. 3.

Shown in FIG. 1 are space vehicles 11 and 13 approaching each other for docking. A conical receptacle 15 is extended from the docking end of the vehicle 11 and a conical projection 17 extends from the docking end of the vehicle 13. Referring to FIGS. 2 and 3, the conical receptacle 15 is supported for extension and retraction at the docking end of the vehicle 11 by a plurality of actuator cylinders 21 pivotally mounted through brackets 23 located at spaced intervals around the inner surface of a space vehicle wall 25.

The actuator cylinders 21 each comprises a piston 27 and a piston rod 29 pivotally connected to a bracket 31 welded to an annular frame member 33 at the small end of the conical receptacle 15. The main body of the receptacle 15 is made of honeycomb paneling material 35 that is joined by fasteners 37 (FIG. 4) to the annular frame member 33 at the small end of the receptacle and is joined to a second annular frame member 39 at the large end of the receptacle. The small end of the receptacle 15 is closed in an air-tight manner by a concave circular plate 41 that nests in the end of the conical projection 17 of the space vehicle 13 upon docking. A hatch (not shown) may be formed in a portion of the plate 41 for establishing passage between the space vehicles following docking.

The actuator cylinder pistons 27 are provided with friction drag or dampening pads 43 (FIG. 2) that increase sliding friction between the piston and the cylinder wall for reasons to be explained hereinafter. Retraction motion of the pistons is effected by gas pressure introduced into the cylinders 21 from high pressure storage bottles 47 under control of valve assemblies 49 mounted on the cylinders. A gas line 51 extends from each valve assembly 49 to the end of the adjacent cylinder 21.

A flexible membrane 53 encircles the conical receptacle 15 and is clamped at one end in a gas-tight manner by a tension cable 54 fitting in a channel 55 (FIG. 4) of a projecting flange portion 57 that is an integral part of the annular frame member 33. The other end of the flexible membrane 53 is clamped to an attachment ring 59 mounted on the wall 25 of the space vehicle 11. A clamping ring 61, screws 63 and a sealant material are employed to insure a gas-tight joint between the flexible membrane and the attachment ring.

The flexible membrane 53 provides a sealed closure around the conical receptacle 15 at all times and helps support the receptacle. When the receptacle is in the retracted position of FIG. 3 the membrane presses against the outside of the receptacle over most of its length and forms a semitoroidal configuration between the receptacle and the attachment ring 59.

A pressure bulkhead 65 of the space vehicle 11 is located near the docking end of the vehicle such that a gas-tight compartment 67 is formed in the region between the bulkhead and the conical receptacle 15. The compartment 67 may be pressurized with a gas such as nitrogen through a gas line 69 from a remote source (not shown) and controlled by valve 71. Gas bleed valves 70 are provided in the wall 25 of the compartment 67 for releasing gas from the compartment 67 during the docking operation that will be described hereinafter. When the conical receptacle 15 is in the retracted position of FIG. 3 the frame member 39 at the large end of the receptacle engages an aligning ring 73 fixed to the wall 25 of the space vehicle 11.

The conical projection 17 extending from the space vehicle 13 comprises a honeycomb shell structure 75 similar to the receptacle 15 and is rigidly joined to the wall of the space vehicle 13 through struts 77 located intermittently around the space vehicle 13 and extending between the large end of the projection 17 and a ring 78 fixed to the wall of the space vehicle 13. A plurality of circumferentially spaced capture latches 79 are carried by the conical projection 17 at the small end thereof to effect a latching between the conical projection and the conical receptacle 15 when these two parts are fully nested together.

As shown in FIG. 4, the latches 79 are each pivotally joined at 81 to a bracket 83 that is welded to an annular frame member 85 at the small end of the conical projection 17. In the latched position the latches 79 project through slots 87 in the member 85 and engage a projection 89 formed on the frame member 33 of the conical receptacle 15. Also pivotally joined to the bracket 83 at 81 is a latch actuator element 91 comprising a pair of spaced arms 93 (FIG. 5) joined near the pivoted end by an integral transverse portion 95. Integral with the portion 95 is a projecting lug 97. A spring 99 is hooked at one end to the lug 97 and at the other end the spring 99 is hooked to a lug 101 that is an integral projecting portion of the latch 79 near its pivoted end. The arms 93 of the actuating element 91 support a roller 103 that enters a slot 105 in the annular frame member 85.

When the conical sections 15 and 17 are fully nested as shown in FIGS. 3 and 4 the latches 79 automatically rotate to the latched position. This automatic latching is due to the roller 103 contacting the frame member 33 of the conical section 15 and causing counterclockwise rotation of the latch actuator 91 which in turn causes counterclockwise rotation of the latch 79 since the spring 99 connects the actuator and the latch.

A cam ring 107 (FIG. 4) is supported within the frame member 85 by a plurality of conventional roller assemblies (not shown). The cam ring 107 engages rollers 109 carried by each of the latches 79. A cam surface such as 111 indicated in broken line is formed on the ring 107 adjacent each roller 109 so that when the ring 107 is rotated slightly by a conventional drive means (not shown) the rollers 109 on the latches 79 will roll over the cam surfaces 111 and rotate the latches 79 to the unlatched position indicated in broken line.

Figure 6:
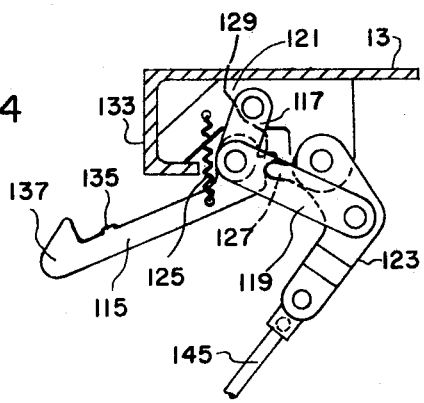
FIGS. 6, 7 and 8 are views illustrating subsequently the operation of the latching mechanism that clamps and locks the meeting ends of the docking vehicles together.

A latching system is also provided at the docking end of the space vehicle 13 for clamping and locking the vehicles 11 and 13 together at the final phase of the docking procedure. This latching system comprises a plurality of circumferentially spaced latches 115 each pivotally attached to a link 117 (FIGS. 6, 7 and 8) and link 119. The link 117 is also pivotally joined to a bracket 121 welded to the inside of the wall of the space vehicle 13. The link 119 is pivotally joined to a bell crank 123 which is pivotally connected to the bracket 121. A tension spring 125 extends between the latch 115 and the bracket 121 and urges the latch toward the latched position shown in FIGS. 3 and 8. In FIGS. 2 and 6 the latch 115 is in the unlatched position and is held in this position by a projecting lug 127 on the bell crank 123 engaging a corresponding lug 129 on the latch 115. As the bell crank 123 is rotated counterclockwise in FIGS. 7 and 8 the lug 127 rotates away from the lug 129 and permits the latch to rotate clockwise toward the latched position under force of the spring 125.

Figure 7:
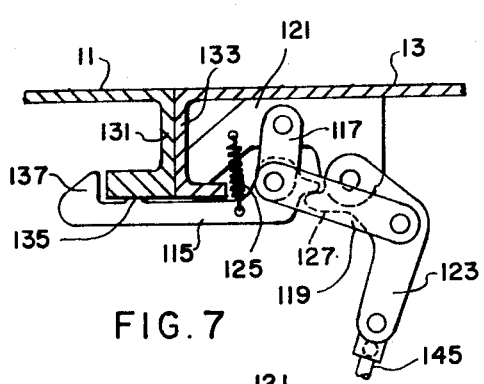
Figure 8:
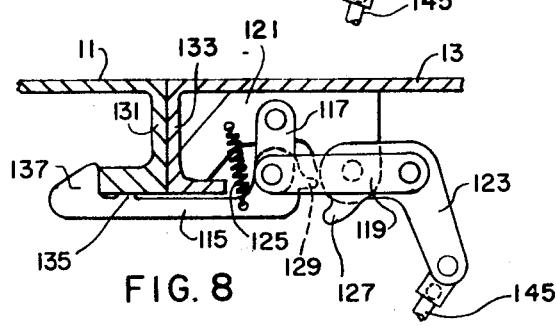

The space vehicles 11 and 13 have abutting end flanges 131 and 133, respectively, and when the latches 115 move to the position shown in FIG. 7 a protuberance 135 on the latch 115 bears on the flange 131 and a latching head portion 137 is opposite the inturned edge of the flange 131. When the bell crank is rotated counterclockwise to the position of FIG. 8 the latch 115 is forced against the flange 131 by force exerted through the link 119 and this movement clamps and locks the space vehicles together.

Actuation of the latches 115 is done through a channel-shaped drive ring 139 (FIGS. 2 and 3) mounted for rotation on the large end of the conical projection 17. The drive ring 139 is guided and restrained by roller assemblies 141 attached intermittently to the conical projection 17 through brackets 143.

Rods 145 are pivotally joined in ball joint fashion to brackets 147 on the drive ring 139 and to the bell cranks 123 so that rotation of the ring 139 causes rotation of the bell crank 123 to produce latching and unlatching action of the latches 115. The small amount of rotation necessary for the drive ring 139 is accomplished by an electric drive unit 149, which may be a harmonic drive unit, mounted on the conical projection 17. The drive unit 149 drives a crank arm 151 pivotally connected to the drive ring 139 through a link 153 and brackets 155.

DOCKING OPERATION

When docking the vehicles 11 and 13 the conical receptacle 15 is extended from its normal retracted position by pressurizing the compartment 67 through gas lines 69 to force the conical receptacle 15 outwardly while being longitudinally supported by the fully extended, unpressurized, actuator cylinders 21. The vehicles are then moved together until the conical projection 17 is fully nested within the conical receptacle 15 at which time the capture latches 79 automatically latch the conical parts together. Subsequently, an immediate inward deflection of the conical receptacle will occur resulting in energy absorbing compression of the gas in the compartment 67.

Rebound forces that develop are countered by introducing high pressure gas from the bottles 47 through the valve assemblies 49 and the gas lines 51 into the actuator cylinders 21 placing the piston rods 29 in tension. The gas in the cylinders 21 is further compressed during rebound placing piston rods 29 in increasing tension. Thus, the force exerted on the conical receptacle 15 by the piston rods 29 becomes sufficient to limit rebound and reverse the direction of relative longitudinal motion between the docked vehicles 11 and 13. The dampening pads 43 on the pistons 27 absorb energy so that the deflection oscillations will cease and the longitudinal pull exerted by the actuator rods is balanced by the equal and opposite pull caused by the pressurized compartment.

Thereafter the pressurized pistons 27 of the actuator cylinders 21 are retracted by reducing the opposing longitudinal force caused by the pressurized docking compartment 67. Reducing the longitudinal force exerted by the docking compartment 67 is accomplished by bleeding gas through gas bleed valves 70 located in wall 25.

When the conical receptacle 15 is fully retracted by the actuator cylinders the flanges 131 and 133 of the docking vehicles will meet and the vehicles are finally clamped and locked together by the latches 115 as shown in FIG. 3.

I claim:

1. A spacecraft having a docking structure at the docking end thereof, said docking structure comprising:
   a cylindrical wall at said docking end of said spacecraft;
   a docking section comprising an open-ended receptacle located within said wall and being adapted to receive a corresponding projection on another spacecraft;
   the end of said receptacle opposite said open end being closed in a gas-tight manner;
   extendible and retractable supporting means for supporting said receptacle within said wall whereby said receptacle may be extended and retracted longitudinally of said wall;
   a gas-tight compartment within said wall adjacent said closed end of said receptacle;
   means for gas pressurizing said compartment and thereby exerting pressure on said receptacle toward the extended position of said receptacle;
   said compartment comprising flexible means extending around said receptacle for maintaining a gas-tight compartment during extension and retraction movement of said receptacle;
   means for controllably releasing gas from said compartment.

2. The invention as defined in claim 1 wherein said receptacle comprises means adapted for engaging latching means of a corresponding docking projection on another spacecraft.

3. The invention as defined in claim 1 wherein said receptacle is conical in shape and is disposed concentrically within said wall, means including said flexible means for permitting the volume of said compartment to vary in response to variations in gas pressure within said compartment and extension and retraction movement of said receptacle.

4. The invention as defined in claim 3 wherein said flexible means comprises a gas-tight membrane joined to the convergent end portion of said conical receptacle, a portion of said membrane contacting and conforming to the conical outer surface of said receptacle when said receptacle is in the retracted position while the remaining portion of said membrane extends in an arcuate curvature from the outer surface of said receptacle toward said wall.

5. The invention as defined in claim 1 wherein said means for supporting said receptacle comprises a plurality of gas-actuated cylinders, each of said cylinders comprising a piston and piston rod, said cylinders being pivotally anchored to said wall, said piston rod being pivotally joined to said receptacle.

6. The invention as defined in claim 5 wherein means are provided on said pistons of said cylinders for increasing friction between said pistons and the walls of said cylinders.

7. Docking structure for in-flight docking of a pair of spacecraft comprising:
   an extendible and retractable docking section carried by the docking end of one of said pair of spacecraft;
   said docking section comprising an open-ended receptacle;
   the end of said receptacle opposite said open end being closed in a gas-tight manner;
   a docking projecting section carried by the docking end of the other of said pair of spacecraft;
   said projecting section corresponding in shape to said receptacle whereby said projecting section may enter and nest within said receptacle;
   said one of said spacecraft having a gas-tight compartment in the docking end region thereof inwardly of said receptacle adjacent said closed end thereof;
   means for gas pressurizing said compartment;
   said closed end of said receptacle being exposed to gas pressure within said compartment when pressurized whereby such pressure would be applied against said closed end of said receptacle;
   extendible and retractable means for supporting said receptacle whereby said receptacle may extend and retract under influence of pressure within said compartment and of docking force applied by said other spacecraft through said projection.

8. The invention as defined in claim 7 wherein said compartment comprises an extendable and retractable flexible membrane, said membrane being adapted to extend when said receptacle extends and retract when said receptacle retracts.

9. The invention as defined in claim 8 including means for latching said projection to said receptacle when said receptacle is in the extended position and further means for latching the pair of spacecraft together when the receptacle is in the retracted position.

10. The invention as defined in claim 8 wherein said receptacle and said projection are conical in shape, said membrane extending around and being attached to said receptacle, said membrane conforming to the conical shape of said receptacle when said receptacle and said membrane are in the retracted position.

* * * * *